United States Patent [19]
Biederman

[11] Patent Number: 6,149,181
[45] Date of Patent: Nov. 21, 2000

[54] SELF-STORING HITCH

[76] Inventor: Frederick Lee Biederman, 20670 Woodhaven Pl., Deephaven, Minn. 55331-9273

[21] Appl. No.: 09/183,559

[22] Filed: Oct. 30, 1998

Related U.S. Application Data

[60] Provisional application No. 60/073,494, Feb. 3, 1998.

[51] Int. Cl.[7] .................................................. B60D 1/00
[52] U.S. Cl. ...................................... 280/491.1; 280/500
[58] Field of Search .......................... 280/491.1, 491.3, 280/491.5, 495, 498, 499, 511, 416.1, 164.1, 500

[56] References Cited

U.S. PATENT DOCUMENTS

| | | | |
|---|---|---|---|
| D. 337,292 | 7/1993 | Carda | D12/162 |
| 2,544,185 | 3/1951 | Sargent | 280/33.44 |
| 2,624,589 | 1/1953 | Strand | 280/33.44 |
| 2,671,674 | 3/1954 | Derksen | 280/491 |
| 2,737,399 | 3/1956 | Halverson | 280/491 |
| 2,838,327 | 6/1958 | Collins | 280/491 |
| 3,614,136 | 10/1971 | Dent | 280/500 |
| 3,640,550 | 2/1972 | Pearson | 280/491 B |
| 3,717,362 | 2/1973 | Johnson | 280/416.1 |
| 4,109,930 | 8/1978 | Pilhall | 280/491 B |
| 4,570,986 | 2/1986 | Sams | 293/117 |
| 5,489,111 | 2/1996 | Collins | 280/495 |

FOREIGN PATENT DOCUMENTS 2753539  6/1979  Germany ........................... 280/491.3

Primary Examiner—Brian L. Johnson
Assistant Examiner—Daniel Yeagley
Attorney, Agent, or Firm—Blake T. Beiderman

[57] ABSTRACT

A retractable hitch that stores away from view. The hitch consists of a hollow connector bar having an attachment end and a receiver end. The attachment end of the connector bar has an opening extending laterally through it. A mounting bar at the receiver end contains a storage chamber. A draw bar having a connector end and a hitch end fits within the connector bar. The connector end has an opening piercing it; and the hitch end has an end for connecting devices. A locking pin extends through the opening in the attachment end of the connector bar and the opening in the connector end of the draw bar. The locking pin locks in a first position for securing the draw bar in a first position for attaching devices and a second position for storing the connector bar within the storage chamber.

20 Claims, 3 Drawing Sheets

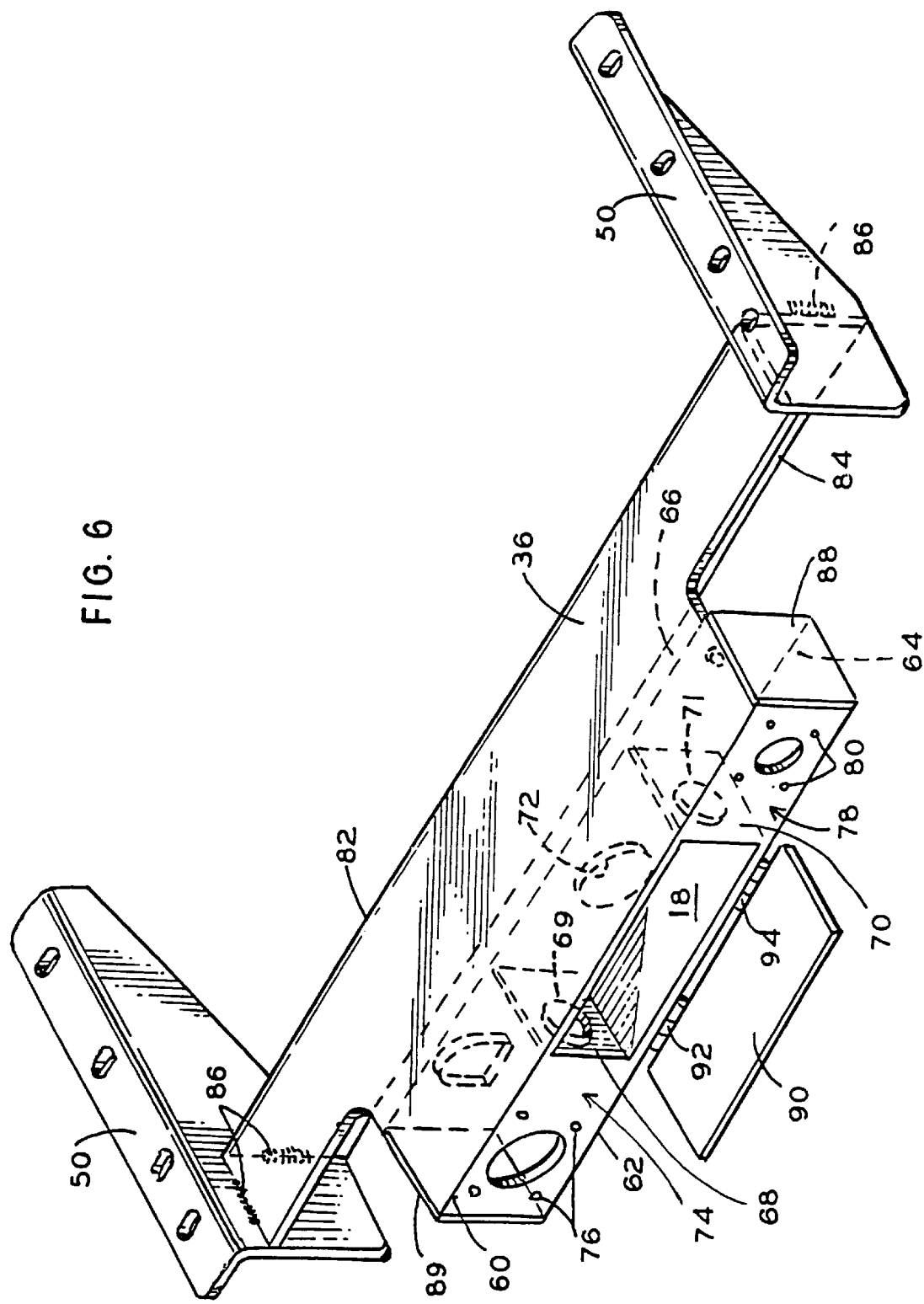

SELF-STORING HITCH

This claims the benefit of provisional application Ser. No. 60/073,494 filed Feb. 3, 1998.

FIELD OF THE INVENTION

This invention relates to retractable hitches. In particular, this invention relates to trailer hitches capable of stowing underneath a vehicle.

BACKGROUND OF THE INVENTION

Most vehicle trailer hitches on the road today have draw bars that project outwardly from a vehicle's rear bumper. Unfortunately, these draw bars require removing a locking pin before storing them remotely from the vehicle's hitch. Therefore, draw bars tend to remain projecting from a vehicle for years at a time. Disadvantages of projecting draw bars include both exaggerated damage during collisions and personal injury to inattentive passers-by.

Over the years, several retractable designs have provided solutions to these problems. C. A. Strand's concealable trailer hitch, U.S. Pat. No. 2,624,589, solved this problem with a coupling ball mounted to an attachment bar. This attachment bar slid in and out from underneath a vehicle and locked in and out of these respective positions. H. I. Pearson, in U.S. Pat. No. 3,640,550, discloses a trailer hitch that folds and locks in and out of position. Finally, J. A. Carda's U.S. Des. Pat. No. 2.337.292 discloses a telescoping trailer hitch.

C. A. Derksen and T. C. Johnson, in U.S. Pat. Nos. 2,671,674 and 3,717,362, respectively disclose retractable trailer hitches that slide and lock along a groove to lock the hitch in its active pulling position and in a stored-away position. F. T. Sargent's U.S. Pat. No. 2,544,185, discloses an L-shaped hitch that pivots and slides in-and-out of position. A locking pin then secures the L-shaped hitch in the desired position. The disadvantage with these pivoting designs is that the hitch remains visible from low angles.

It is the object of this invention to provide a retractable hitch that stores in a position where a coupling ball remains hidden at low angles during storage.

It is a further object of the invention to provide a hitch that extends from a hidden position underneath a vehicle and locks into a pulling position.

It is a further object of this invention to protect a coupling ball from moisture, sand and road salt during storage.

SUMMARY OF THE INVENTION

The invention consists of a retractable hitch that stores away from view. The hitch consists of a hollow connector bar having an attachment end and a receiver end. The attachment end of the connector bar has an opening extending laterally through it. A mounting bar at the receiver end contains a storage chamber. A draw bar having a connector end and a hitch end fits within the connector bar. The connector end has an opening piercing it and the hitch end has an end for connecting devices. A locking pin extends through the opening in the attachment end of the connector bar and the opening in the connector end of the draw bar. The locking pin locks in a first position for securing the draw bar in a first position for attaching devices and a second position for storing the connector bar within the storage chamber.

BRIEF DESCRIPTION OF THE DRAWING

FIG. 6 is a perspective view of a mounting constructed from metal plate with the storage chamber containing an electrical connector port and an electrical power port.

DESCRIPTION OF PREFERRED EMBODIMENT

The retractable hitch design of the invention stores a draw bar and trailer ball in a storage chamber protected below the bumper or underside of a vehicle. The hitch's draw bar rotates ninety degrees to store and lock within a storage chamber. The design provides for storing draw bars having either a round or a square cross section. Optionally, the design also includes a permanent electrical outlet within the storage chamber. Most advantageously, a door closes to protect the draw bar and hitch ball, when the draw bar is in the stored position.

Figure 1:
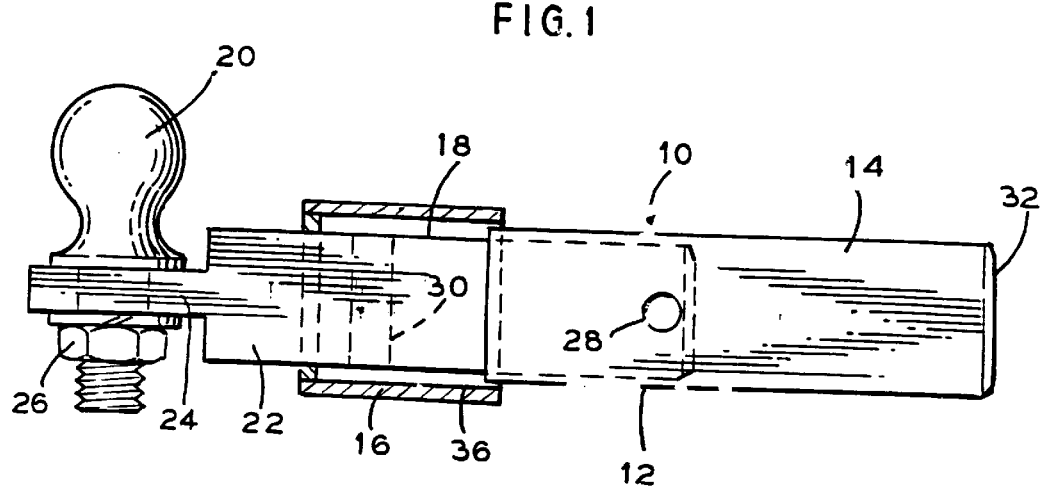
FIG. 1 is a side view or the self-storing hitch having a mounting bar in cross section and portions broken away to illustrate the hitch in an active or pulling position.

Referring to FIG. 1, retractable hitch 10 consists of a hollow connector bar 12 secured to a vehicle by any fastening means such as nut-and-bolt or welding to a steel frame. Optionally, it is possible to weld connector bar 12 directly to the bottom of a vehicle. The connector bar 12 has a rear end 14 and a receiver end 16. The receiver end 16 contains a storage chamber 18 that stores away hitch ball 20 attached to draw bar 22. The hitch ball 20 attaches to the hitch end 24 of the draw bar 22 with a threaded nut 26, locking pin or any other fastening device. Hitch end 24 may contain any means for attaching devices such as a ball-type hitch or a nut-and-bolt connector. Most advantageously, the hitch end contains a ball-type hitch for receiving trailer sockets.

The connector bar 12 contains a first opening 28 for securing the draw bar in an active position. In the active position, the draw bar attaches to trailers, bike racks or other accessories. And the draw bar contains a first opening 30 for storing the draw bar 22 in a hidden position. This stores the draw bar 22 within the connector bar 12 with the hitch end 24 and the hitch ball 20 within the storage chamber 18. Most advantageously, the hitch ball 20 twist ninety degrees to store parallel to mounting bar 36 in storage chamber 18. Furthermore, the length of storage chamber 18 is most advantageously less than one half of the length of the mounting bar 36 to reduce weight.

Optionally, it is possible to also use a single opening through the draw bar and two openings through the connector bar, with a pin locking the draw bar in both the active and stored positions. Optionally, it is also possible to configure the connector and draw bars with two or more holes each to allow a pin to lock the draw bar into the active and stored positions. Removing the locking pin (not seen) from opening 28 frees draw bar 22 for removal or storage. In the storage position, end cap 32 most advantageously prevents dirt and debris from entering within connector bar 12.

Figure 2:
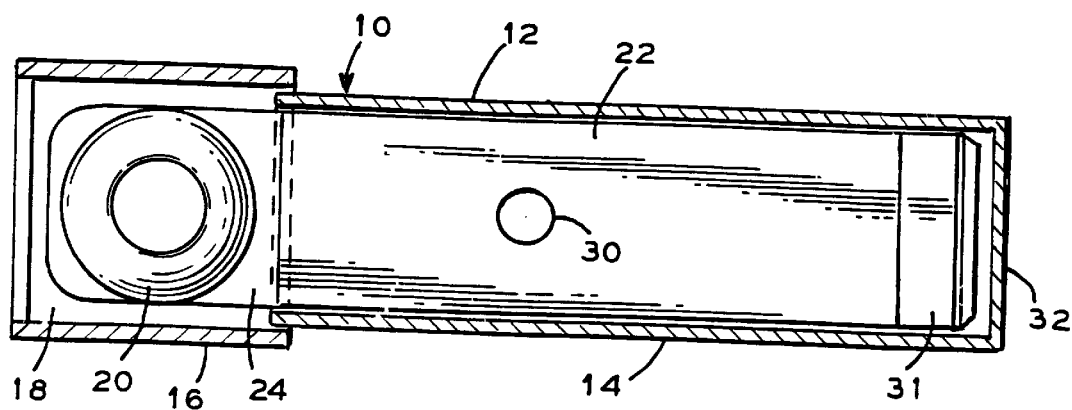
FIG. 2 is a side view of the self-storing hitch of FIG. 1, with portions broken away, to illustrate a draw bar in the stored hitch.

As illustrated in FIG. 2, the operator pulls the pin (not seen) from second opening 31, twists the draw bar 22 and inserts a pin into opening 30 to lock the hitch ball 20 within chamber 18. Although a ninety degree twist is the most convenient angle for securing trailer balls, it is possible to use any other degree of rotation or even no rotation. If using a square cross bar, then the operator must pull the draw bar out of the connector bar 12 to twist the bar.

Figure 3:
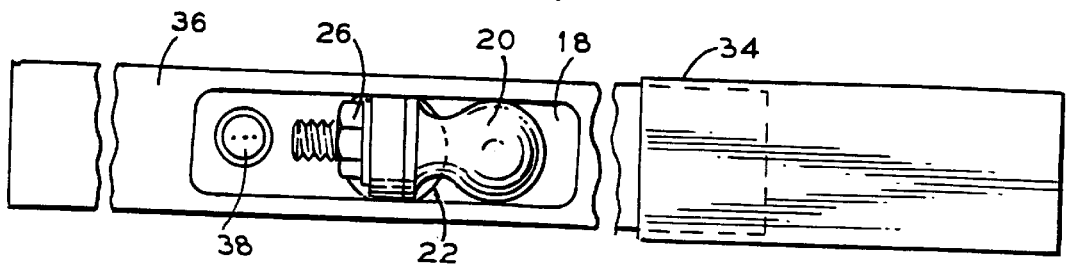
FIG. 3 is an end view of the self-storing hitch of FIG. 1 with the sliding cover open to illustrate the electrical outlet and stored hitch and with portions broken away.

The storage chamber 18, illustrated in FIG. 3, provides several unique advantages. First the design allows for sliding cover 34 to seal chamber 18. Advantageously, sliding cover 34 wraps around three sides of mounting bar 36 and locks shut. Optionally, spring-loaded hinges secure a cover to close chamber 18. Constructing the sliding cover out of plastic or another highly corrosion resistant material allows manufacturers to place decorative designs in a location visible from other vehicles. Optionally, an additional opening through the mounting bar 36 serves to function as a mounting location for electrical connector 38, such as a trailer brake and light connector. Most advantageously, the storage chamber 18 contains the electrical connector 38.

Figure 4:
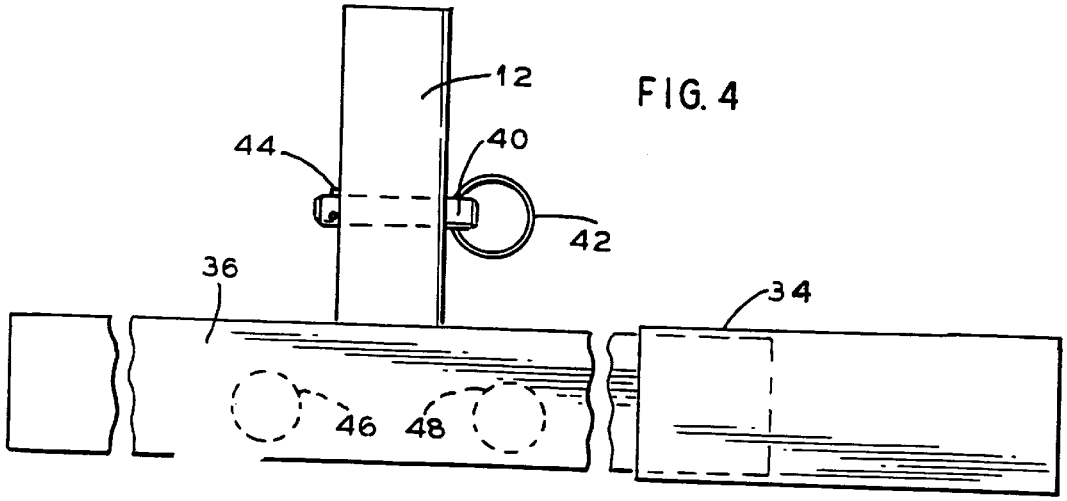
FIG. 4 is a top view of the self-storing hitch of FIG. 1 locked in the stored position and with portions broken away.

Referring to FIG. 4, locking pin 40, advantageously contains ring 42 and locking ball 44 for quick release and locking of the draw bar in the operating position or the storage position. Alternatively, pin 40 may consist of a theft resistant design or contain a lock to prevent the theft of the draw bar. Openings 46 and 48 provide a secure location for mounting safety chains that connect trailers to the mounting bar 36.

Figure 5:
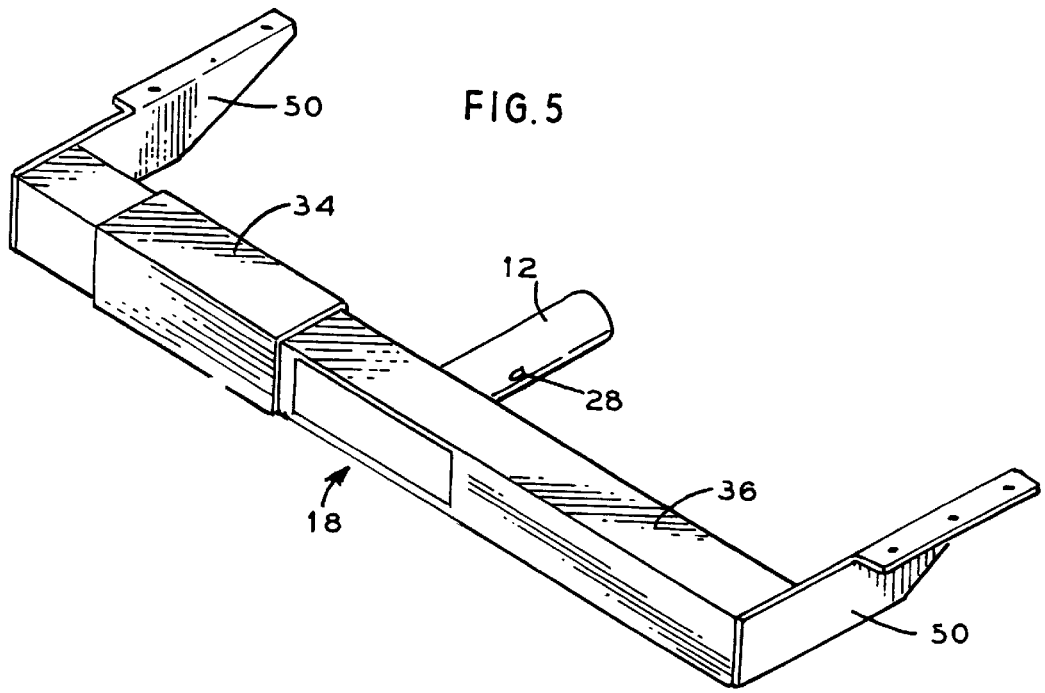
FIG. 5 is a perspective view of the mounting bar of FIG. 1 that incorporates a storage area with the draw bar not illustrated.

As demonstrated in FIG. 5, mounting bar 36 advantageously extends out perpendicular to connector bar 12. Advantageously, mounting bar 36 consists of tubular steel having a round or square cross-section. Advantageously, the mounting bar 36 contains square cross-section tubing. The hollow square bar cut open on one side serves to allow access into the storage chamber 18. Most advantageously, mounting brackets 50 mount the entire structure to a vehicle. Storage chamber 18 most advantageously contains walls on six sides to protect the draw bar in its stored position. In this configuration, the hitch ball 20 and threaded nut 26 of the ball-type hitch stores parallel to the mounting bar 36. Mounting brackets 50 fasten to a vehicle by either welding or bolting it to the vehicle's frame.

Optionally, high strength metal sheet or plate forms the mounting bar 36—see FIG. 6. Advantageously, ninety degree inward bends 60, 62 and 64 bend steel plate to form storage chamber 18. It is possible to replace the inward bends with a welded scam. Welded connection 66 secures the storage chamber portion of the mounting bar 36. Furthermore, it is possible to replace this seam with an inward bend of a plate. Storage chamber 18 advantageously contains safety chain plates 68 and 78 welded into place. The safety chain plates rely on openings 69 and 71 for securing the appropriate safety chain.

Most advantageously, plates 68 and 70 provide sufficient space for twisting a draw bar (not seen) and storing it in two storage positions one-hundred-eighty degrees apart. These two positions are symmetrically spaced from draw bar opening 72. Most advantageously, the storage chamber contains electrical connector housing 74 opposite storage chamber 18 with threaded openings 76 for receiving and mounting electrical connectors such as five-pin, seven-pin and other trailer connectors. Screws mount the electrical connectors into threaded openings 76 to secure the majority of the connector within housing 74. Similarly, the storage chamber 18 most advantageously contains a power connector housing 78 with threaded openings 80 for receiving and mounting a power connector such as a 12-volt receptacle. Screws mount the power connectors into threaded openings 80 to secure the majority of the connector within housing 78. Most advantageously, housings 74 and 78 contain front and rear openings sized to receive standard plugs or wires.

Bending the mounting bar 36 ninety degrees at bend 82 forms a protective plate 84 for strength, rigidity and compact securing to brackets 50. Protective plate 84 consists of a tail end flange that defines the maximum inner distance for the connector bar and extends downwardly behind the connector bar (not seen) to protect the connector bar from projecting outwardly in an obstructed manner toward the vehicle. Optionally, it is possible to mount a protective plate directly to the connector end of the connector bar. Most advantageously, welding tabs 86 ensure strong bonding and a good fit between mounting bar 36, protective plate 94 and mounting brackets 50. Advantageously, end plates 88 and 89 prevent debris from entering housings 74 and 78. Similarly, plate 90, advantageously folds at hinges 92 and 94 to close the storage chamber when the draw bar (not seen) is in the stored position. Most advantageously, the hinges mount inside storage chamber 18.

The hitch design functions with both round and square cross section draw bars. It stores the draw bar in a location not visible from other vehicles when a hinged or sliding door covers the storage area. Furthermore, the compact design allows the mounting bar to function as a fastening structure and as a draw bar storage container. Furthermore, the mounting bar acts as a bumper when the draw bar is in the stored position.

While in accordance with the provisions of the statute, there is illustrated and described herein specific embodiments of the invention. Those skilled in the art will understand that changes may be made in the form of the invention covered by the claims and that certain feature of the invention may sometimes be used to advantage without a corresponding use of other features.

I claim:

1. A retractable hitch comprising:
   a hollow connector bar, the connector bar having an attachment end, a receiver end and fastening means for fastening the connector bar to a vehicle, the attachment end having an opening extending laterally through the attachment end, the receiver end having a storage chamber, and the storage chamber having a door; the storage chamber comprising an opening that stores away a hitch ball and has connector housings mounted on opposite sides of the storage chamber opening;
   a draw bar that fits within the connector bar, the draw bar having a connector end and a hitch end, the connector end having an opening piercing the connector end and the hitch end having a ball-type hitch for attaching devices; and
   a locking pin, the locking pin extending through the opening in the attachment end of the connector bar and the opening in the connector end of the draw bar in a first position for locking the draw bar in an active position for attaching devices; or a second position through the connector bar and the draw bar for storing the draw bar within the connector bar and closing the storage chamber with the door closed and the hitch end of the draw bar and the ball-type hitch within the storage chamber.

2. The retractable hitch of claim 1 wherein the fastening means for fastening the connector bar to the vehicle consists of a mounting bar attached perpendicular to the connector bar and the storage chamber consists of an opening in the mounting bar.

3. The retractable hitch of claim 1 wherein the door consists of a sliding door that slides open to allow the draw bar to be placed in the active position and slides closed to hide the draw bar within the connector bar.

4. The retractable hitch of claim 1 wherein the door consists of a hinged door that opens to allow the draw bar to be placed in the active position and closes to hide the draw bar within the connector bar.

5. The retractable hitch of claim 1 wherein the draw bar has a first opening for locking the draw bar in the first position for attaching devices and a second opening in the second position for storing the draw bar within the connector bar.

6. The retractable hitch of claim 1 wherein the mounting bar contains square cross-section tubing to form the storage chamber.

7. The retractable hitch of claim 1 wherein metal plate forms the mounting bar and bends inwardly to form the storage chamber.

8. The retractable hitch of claim 1 wherein the storage chamber contains an electrical connector housing.

9. The retractable hitch of claim 2 wherein the storage chamber contains a power connector housing.

10. The retractable hitch of claim 1 wherein the storage chamber allows storing the draw bar in two storage positions twisted one-hundred eighty decrees apart.

11. A retractable hitch comprising:

a hollow connector bar, the connector bar having an attachment end and a receiver end, the attachment end having an opening extending laterally through the attachment end, the receiver end having a storage chamber and a mounting bar attached perpendicular to the connector bar for fastening the connector bar to a vehicle, and the storage chamber having a door; the storage chamber comprises an opening that stores away a hitch ball and has connector housings mounted on opposite sides of the storage chamber opening;

a draw bar that fits within the connector bar, the draw bar having a connector end and a hitch end, the connector end having an opening piercing the connector end and the hitch end having a ball-type hitch for attaching devices; and a locking pin, the locking pin extending through the opening in the attachment end of the connector bar and the opening in the connector end of the draw bar in a first position for locking the draw bar in an active position for attaching devices; or a second position through the connector bar and the draw bar for storing the draw bar within the connector bar and closing the storage chamber with the door closed and the hitch end of the draw bar and the ball-type hitch within the storage chamber.

12. The retractable hitch of claim 11 wherein the storage chamber consists of an opening in the mounting bar.

13. The retractable hitch of claim 11 wherein the door consists of a sliding door that slides open to allow the draw bar to be placed in the active position and slides closed to hide the draw bar within the connector bar.

14. The retractable hitch of claim 11 wherein the door consists of a hinged door that opens to allow the draw bar to be placed in the active position and closes to hide the draw bar within the connector bar.

15. The retractable hitch of claim 11 wherein the draw bar has a first opening for locking the draw bar in the first position for attaching devices and a second opening in the second position for storing the draw bar within the connector bar.

16. The retractable hitch of claim 11 wherein the ball-type hitch having a vertical axis stores parallel to the mounting bar when in the second position.

17. The retractable hitch of claim 11 wherein the mounting bar contains square cross-section tubing to form the storage chamber.

18. The retractable bitch of claim 11 wherein the storage chamber contains an electrical connector housing.

19. The retractable hitch of claim 18 wherein the storage chamber contains a power connector housing.

20. The retractable hitch of claim 19 wherein the storage chamber allows storing the draw bar in two storage positions twisted one-hundred eighty degrees apart.

* * * * *